United States Patent
Silva et al.

(10) Patent No.: US 12,143,238 B2
(45) Date of Patent: Nov. 12, 2024

(54) HOME AUTOMATION PLATFORM

(71) Applicant: Sendal, Inc., Vero Beach, FL (US)

(72) Inventors: Michael C. Silva, E. Sandwich, MA (US); James W. Carroll, Vero Beach, FL (US)

(73) Assignee: Sendal, Inc., Vero Beach, FL (US)

( * ) Notice: Subject to any disclaimer, the term of this patent is extended or adjusted under 35 U.S.C. 154(b) by 202 days.

(21) Appl. No.: 17/493,147

(22) Filed: Oct. 4, 2021

(65) Prior Publication Data

US 2023/0107818 A1     Apr. 6, 2023

(51) Int. Cl.
    H04L 12/28      (2006.01)
(52) U.S. Cl.
    CPC ........ *H04L 12/2829* (2013.01); *H04L 12/282* (2013.01); *H04L 12/2825* (2013.01); *H04L 2012/285* (2013.01)
(58) Field of Classification Search
    CPC ............... H04L 12/2829; H04L 12/282; H04L 12/2825; H04L 2012/285
    See application file for complete search history.

(56) References Cited

U.S. PATENT DOCUMENTS

| | | | | |
|---|---|---|---|---|
| 2005/0159823 | A1* | 7/2005 | Hayes | H04L 12/2803 700/19 |
| 2010/0191352 | A1* | 7/2010 | Quail | H04L 12/2809 700/90 |
| 2011/0106279 | A1* | 5/2011 | Cho | H04L 12/2818 700/90 |
| 2015/0370621 | A1* | 12/2015 | Karp | F24F 11/62 719/328 |
| 2016/0274552 | A1* | 9/2016 | Strohmenger | G06Q 10/06 |
| 2019/0058985 | A1* | 2/2019 | Karp | G06F 9/546 |

* cited by examiner

*Primary Examiner* — Christopher E. Everett
(74) *Attorney, Agent, or Firm* — Armis IP Law, LLC

(57) ABSTRACT

A home automation platform coalesces various devices for home monitoring, control and automation in a comprehensive control application for complete home control. Devices sourced from different vendors are responsive to the control application via a GUI from a personal device. User authentication is handled transparently through exchanges with the vendor specific website for a particular device. A set of agents monitors device operation and builds a model for issuing autonomous instructions to the devices based on the model of established operation. Compatible devices may be any suitable IP addressable device, and the agents gather a history of devices concerned with different comfort and function areas, such as lighting, appliances, air quality and occupancy awareness (e.g. security). In this manner, comprehensive, cross-vendor oversight is implemented from a common control via the personal device app, and a gathered history of home usage drives learning of a usage model for autonomous operation.

20 Claims, 8 Drawing Sheets

HOME AUTOMATION PLATFORM

BACKGROUND

A myriad of devices have emerged in recent years purporting to fulfill so-called "Home Automation" tasks. Mundane and simple interactions that occur in an inhabited space can be programmed and/or autonomously performed by small, low cost consumer electronic devices. Functions such as light switches, doorbells, security/perimeter alarms, appliances, streaming/media interfaces, thermostat/HVAC control, fire/smoke/flood hazards and other actions and observations frequently performed by an occupant of a dwelling can be accommodated. Such devices are marketed by multiple vendors, and many incorporate Internet connectivity via WiFi and GUI (Graphical User Interface) control from personal devices.

SUMMARY

A home automation platform coalesces various devices for home monitoring, control and automation in a comprehensive control application for complete home coverage. Devices sourced from different vendors are responsive to the control application via a GUI from a personal device. User authentication is handled transparently through exchanges with a vendor specific website for a particular device. A set of agents monitors device operation and builds a model for issuing autonomous instructions to the devices based on the model of established operation. Compatible devices may be any suitable IP addressable device, and the agents gather a history of devices concerned with different comfort and function areas, such as lighting, appliances, air quality and occupancy awareness (e.g. security). In this manner, comprehensive, cross-vendor oversight is implemented from a common control via the personal device app, and a gathered history of home usage drives learning of a usage model for autonomous operation.

Configurations herein are based, in part, on the observation that conventional home automation devices are sourced by multiple vendors for various functions within the home, and are rising in popularity due to lowering costs and increasing Internet availability. Wireless Internet capability is becoming almost as commonplace as a traditional utility, and Internet addressable adapters, e.g. WiFi receivers, are inexpensively deployable.

Some more commonly deployed home automation devices include lighting controls, environmental (i.e. Heating, Ventilation and Air Conditioning, or HVAC) controls, indoor air quality (IAQ) monitoring, doorbells and entry access/locks, security and video monitoring, and control of household appliances, to name several. Additional devices and capabilities are continually emerging, driven by vendor competition and both the real estate and retail electronics market, as these home automation devices (devices) enhance purchase appeal of both real estate (new homes) and consumer goods (comfort elements within the home).

Unfortunately, conventional approaches to home automation suffer from the shortcoming that capabilities for access are generally dependent on the vendor and vendor provided controls. Users may become dependent on a particular vendor to ensure common control for multiple devices, or to avoid learning a new interface. Similarly, new home purchasers may feel locked into a vendor brand selected by the builder or previous owner. It may be problematic to add or upgrade a user's device suite to new devices from other vendors.

Accordingly, configurations herein substantially overcome the shortcomings of a collection of home automation devices sourced from heterogeneous vendors. The home automation server provides a single global command set generally applicable to devices or various vendors, and accesses a vendor specific API (Application Programming Interface) based on a mapping of a user command to a device instruction corresponding to a vendor specific device. User privileges and authentication are also provided by registering or authenticating the server for device use, and a history of device usage and patterns is maintained and used for training a user specific model for predicting and generating autonomous commands for a dwelling once a specific user routine is recognized.

In further detail, in an automated dwelling environment having one or more devices responsive to commands for executing home automation functions, a method of directing the devices in the dwelling includes receiving a command to direct a device disposed in a dwelling, and accumulating the command in a history of the commands, along with at least one condition under which each of the received commands was received. A server issues a device instruction to the device for performing an action according to the command, and an agent subsequently replicates a previously received command based on the history and the condition by issuing the device instruction to the device.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the discussion that follows, an example of an environment supporting multiple dwellings with a plurality of devices responsive to a home automation server (server). In the example shown, the server executes on a cloud resource or so-called "cloud computing" host via the Internet, although other suitable computing devices may be employed to host. A user application "app" is operable on a personal mobile device of the user, typically a smartphone or tablet, and the devices are commonly available network conversant devices supplied by various vendors. A user's home may be "automated," that is, equipped with devices responsive to the server in an incremental manner, by adding one or several devices at a time. Alternatively, devices may be installed all at once as part of a new home construction or renovation of an existing home.

Figure 1:
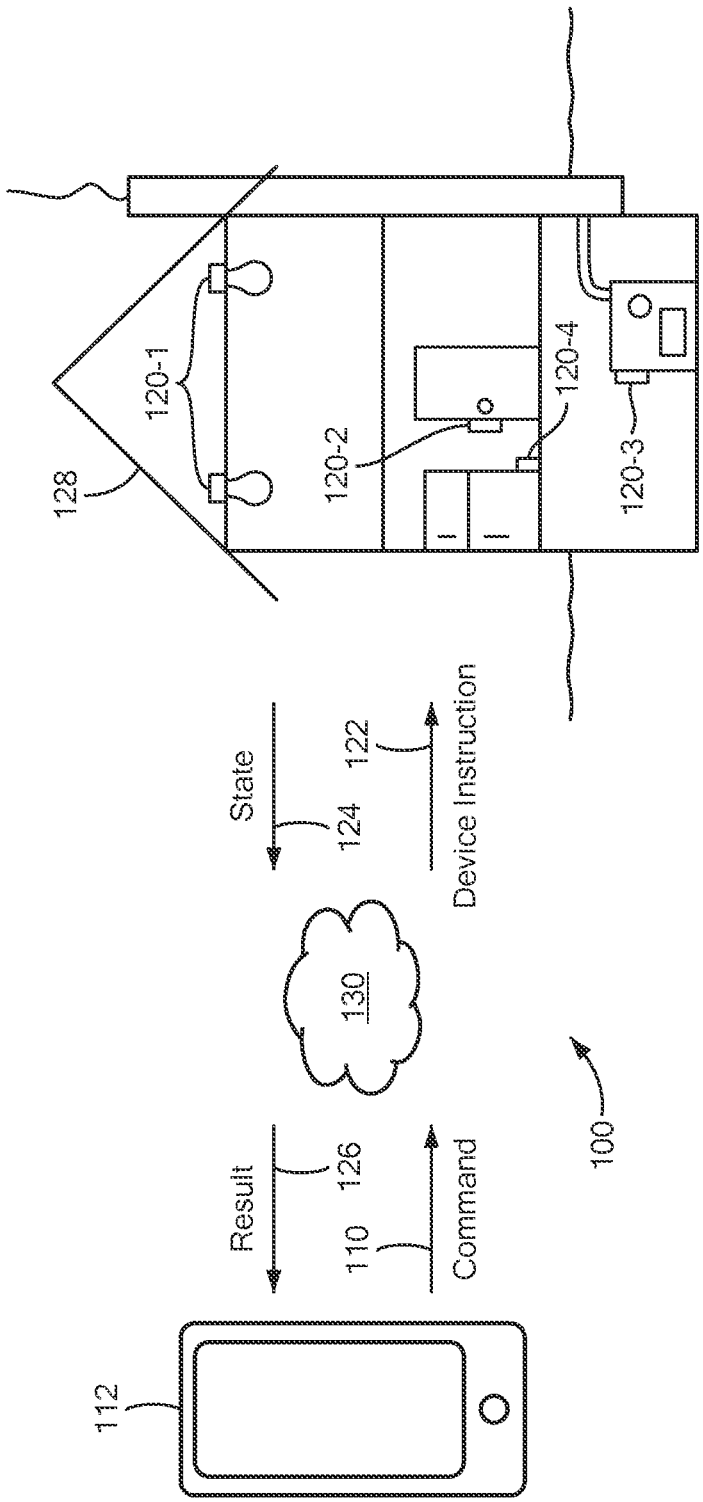
FIG. 1 is a context diagram of a home environment suitable for use with configurations herein.

FIG. 1 is a context diagram of a home environment suitable for use with configurations herein. Referring to FIG. 1, in the home environment 100, a method of remote and autonomous operation of home fixtures, appliances and portals includes receiving a command 110 to direct a device 120-1 . . . 120-N (120 generally) disposed in a dwelling 128. These devices are marketed for remote network performance of autonomous home actions. Example devices include controls for lights 120-1, door locks 120-2, HVAC devices such as a furnace 120-3, and appliances such as a refrigerator 120-4. Other suitable devices 120 may be employed. A mobile device 112 transmits the command 110 to a server via a public access network 130 such as the Internet. The server maps the command 110 to a device instruction 122 for directing a specific device 120. The device 120 returns a state 124 that was changed or achieved by the device, and a result 126 indicates the completion on the mobile device 112.

In general, each of the home automation devices, or simply device 120, is a network conversant entity installed in a room location in the home and operable for receiving a command from a set of predetermined commands and transmitting a state indicative of a current mode, position or result, often based on previous commands but also alterable by external user activities (i.e. opening/closing a door).

Directing means commencing an action or report concerning the device and the home automation function performable by the device, such that the action is based on a command 110 and the report based on a current state 124 of the device and/or an object of the automation function that the device is adapted to perform. Directing therefore includes reading and reporting a (possibly unknown) unchanged state, which establishes a current state of the device. Each of the devices has at least one state and a plurality of device instructions to which the device is responsive, such that the device instructions are generally for changing or reading the state.

Actuating the device refers to the receipt of a command by the device for performing the function such that the function typically results in a different state than a state the device had prior to receiving the command. In general, the commands 110 map to a device instruction 122, which directs the device and may optionally actuate the device; hence an actuation includes directing.

Conventional approaches operate only with the device instruction supplied by the particular vendor, and often from or through the vendor specific website. There is no general or common command set, nor a mapping of the command 110 to a device instruction 122 recognized by the specific device 120.

Figure 2:
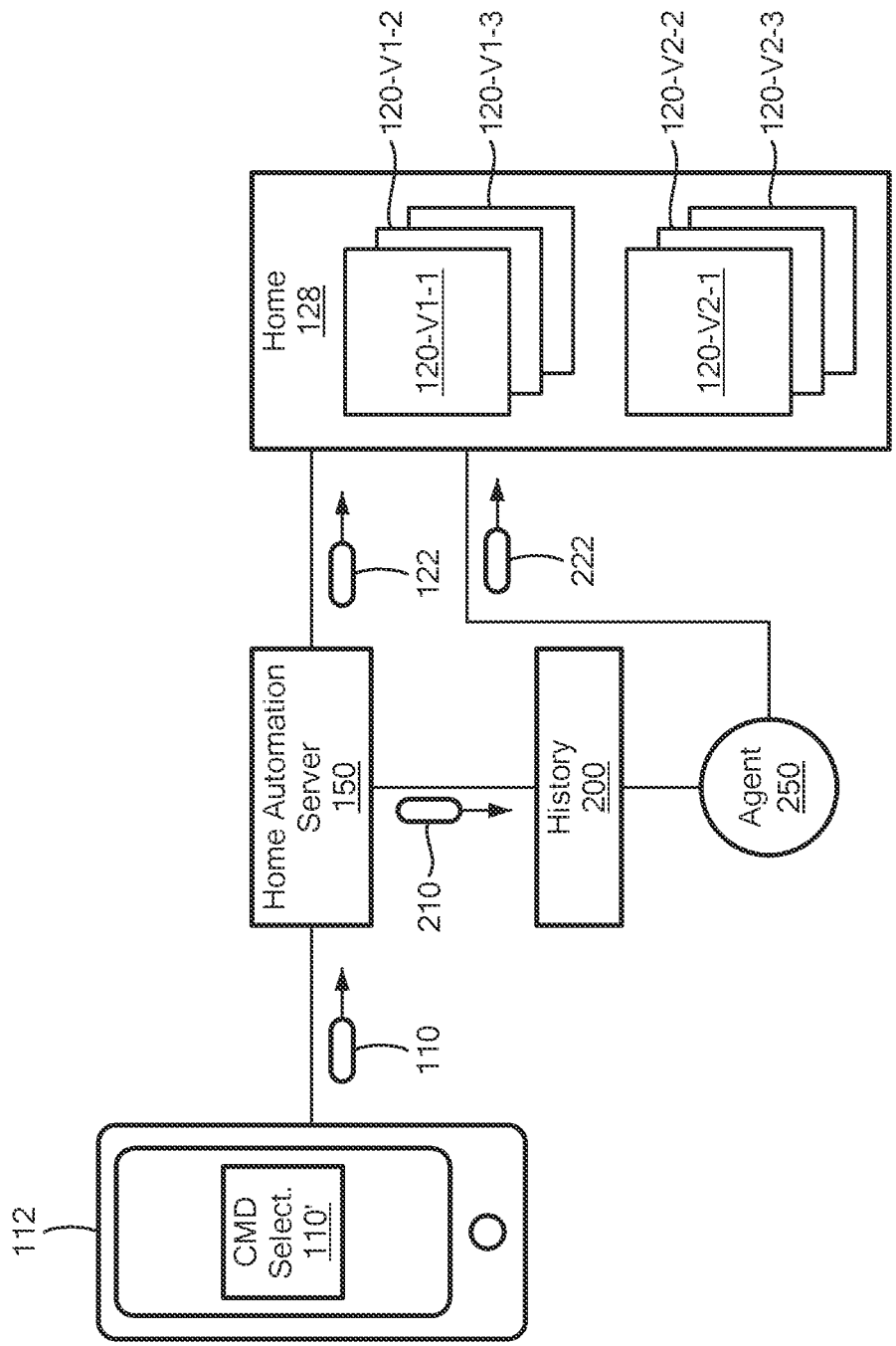
FIG. 2 is a data flow diagram illustrating device operation in the environment of FIG. 1.

FIG. 2 is a data flow diagram illustrating device operation in the environment of FIG. 1. Referring to FIGS. 1 and 2, the home environment 100 includes the automated dwelling 128, which includes one or more devices 120 responsive to the commands 110 for executing home automation functions such as directing and actuating the devices. A user makes a command selection 110' on the user device 112 for a command 110. The server 150 receives the command 110 to direct a device 120 disposed in the dwelling 128. The server 150 issues a device instruction 122 to the device 120 for performing an action according to the command 110. The action may be an actuation, such as unlocking a door, or it may simply direct the device read a current state. For example, doors may be locked and unlocked by manual control, as well as via a corresponding device 120. A device instruction may simply inquire about the state of the door, in case it was changed manually since the previous actuation.

In general, however, the device instruction 122 is a vendor specific message read by the device 120, based on a vendor agnostic command 110 from the user device 112.

Concurrently, the server 150 accumulates the command 210 in a history 200 of the commands. The history stores the commands and context in which they were requested; at a minimum the history includes at least one condition under which each of the received commands was received, such as a date and time. Other relevant conditions may also be stored. For example, a command to turn off lights may store sunrise or sunset times of the current date, to identify lights turned on around dusk or lights turned off at dawn. A command to lock a door may make note of other doors, such as whether the front and back doors are typically locked together.

The device instruction 122 is addressed to a particular device 120, typically by a network ID such as an IP address or MAC (Media Access Control) address. Most homes have an active WiFi network which can address the devices as network IP nodes. Any suitable identifier to uniquely identify the device may be employed, as other network protocols may be employed.

The devices 120 in the home, as indicated above, may originate from different vendors. In the example of FIG. 2, devices from vendor 1 include 120-V1-1 . . . 120-V3-3, and devices from vendor 2 include 120-V2-1 . . . 120-V2-3. The server 150 has a network identifier of the device 120 to which the device instruction 122 should be delivered, discussed further below.

One or more agents 250 receives the history, and based on a correlation of the conditions under which a command was received, may subsequently replicate the previously received command based on the history and the condition by issuing the same device instruction 122 to the device 120. The agent 250 may build a machine learning (ML) model, and issue the autonomous device instruction 222 if the conditions indicate a sufficiently high probability that the user would have sent the command, discussed further below. The autonomous device instruction 222, although shown conceptually as being sent directly to the device 120, actually passes through the server for any associated permission and authentication requirements, and is physically delivered similar to the requested device instruction 122.

The agents 250 may include various logic for issuing autonomous device instructions, in addition to command history or AI to run their logic. Some agents are designed to respond to specific states from devices. For example:

An agent can monitor indoor air quality (IAQ) sensor states from devices within the home and send command to turn on fans to improve air quality. The same agent can also monitor for other actions known to lead to poor air quality, for example it can monitor connected cooktops for indications that they have turned on. Food cooking is a major source of indoor air pollution. The agent can proactively turn on fans before the IAQ sensors report poor air quality when cooking starts.

An even simpler example; an agent can turn on lights in the home when a connected doorbell is rung to ensure the home looks occupied, to illuminate the door entryway, and to provide a safe path to the door within the home if the home is otherwise dark.

Figure 3:
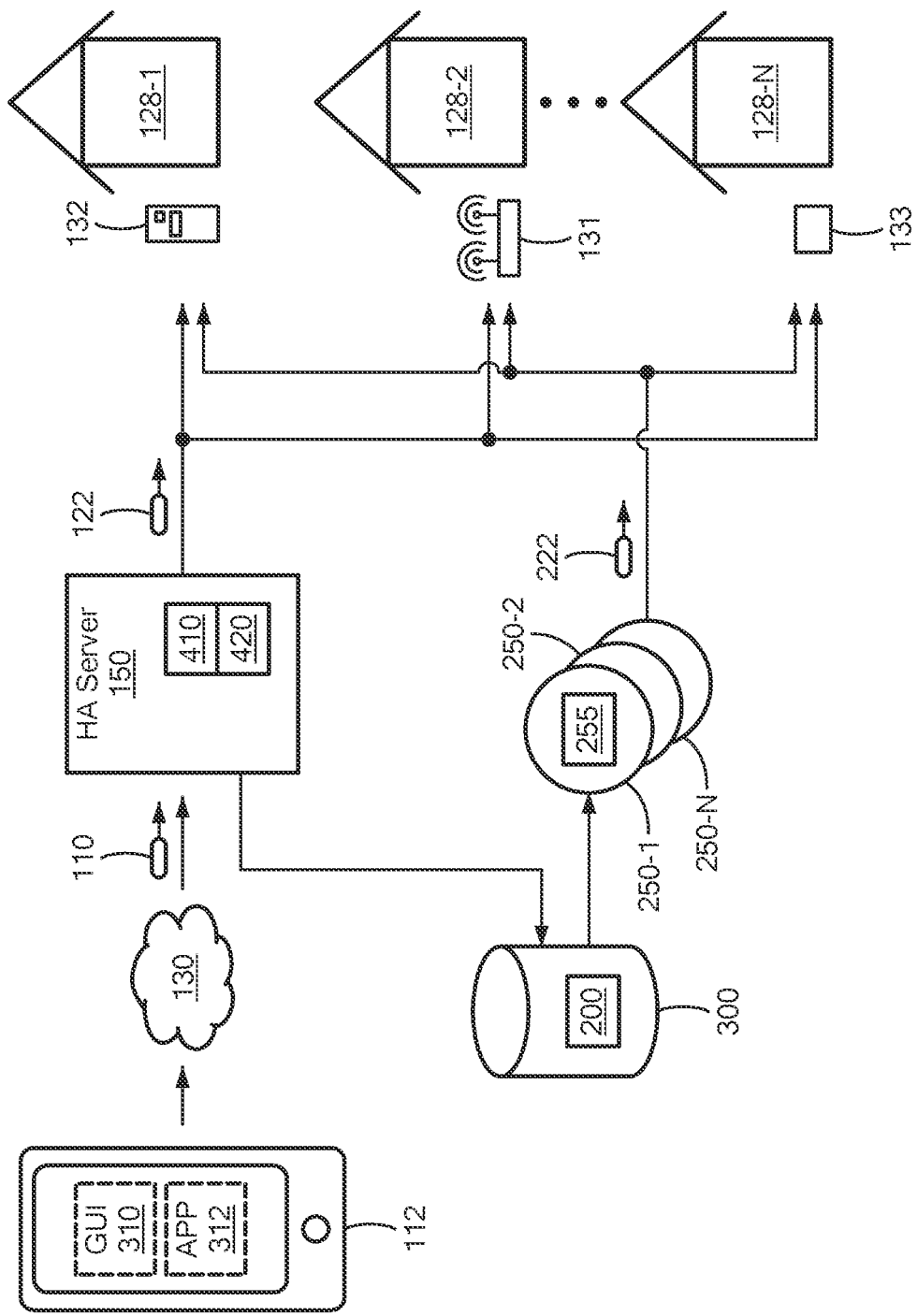
FIG. 3 is a block diagram of the control exhibited in FIG. 2.

FIG. 3 is a block diagram of the control exhibited in FIG. 2. Referring to FIGS. 1-3, FIG. 3 shows an example configuration of an infrastructure network supporting the data flow of FIG. 2. User control commences with an app 312 on the mobile device 112 and operable for sending the command 110. A GUI 310 renders the available devices and command selections for user control. The app 312 is a mobile extension of the server 150 for remote connectivity via the public access network 130. Note that "remote" refers to the server 150, as it is well conceived that a user disposed in the dwelling 128 may invoke the app 312 for sending a command 110 to a device 120 in the dwelling 128. Other computing elements, such as desktops and laptops, may of course invoke the app 312.

A data repository 300 is invoked for storing the history 200 including the commands, device states and included conditions in the history over a duration or operation, such as a week or a month. The data repository 300 may be any available storage medium, such as the cloud store used to host the server 150. One or more agents 250-1 . . . 250-N (250 generally) access the history 200 for computing a prediction of receipt of a command 110 based on the history, such that the prediction has a correspondence to a previously established pattern. The agent 250 issues the autonomous device instruction 222 according to the prediction. Note that the prediction is based on the command 110 sent by the user, and the device instruction 122 results from mapping the predicted command based on the user and device, as discussed above.

The history 200 stores the commands and conditions under which they are received. The conditions include time, at a minimum, and other conditions relevant to the user sending the command. The conditions define one or more attributes corresponding to performance of the command, such that the attributes are defined in a model 255 for coalescing a pattern of attributes and values of the attributes aligning with the history. Any suitable data item may be gathered for computing the autonomous device instruction 222, such as the previously sent instructions, device state, external factors such as time of day, weather and other gatherable data items that may tend do suggest a reason or motivation for device 120 actuation or invocation.

The agents 250 each address a prediction of a command for a particular theme or focus, such as lighting, air quality, appliances, doorbell/entry and occupancy awareness. Each theme is based on a set of commands which are likely to be interrelated in invocation, for example, when downstairs lights are on, upstairs lights might tend to be off. An agent is designated to a set of commands that affect a particular focus. The history 200 therefore stores commands based on a group of commands deemed related to a particular focus, and an agent designated for computing autonomous commands within the group.

For each command in the history 200, an agent 250 is designated corresponding to the command, in which the agent is configured for accumulating the history for a control group including a plurality of the commands having a control objective or focus. Note that some commands may be pertinent to more than one group, depending on the features considered by each agent 250.

Each dwelling 128-1 . . . 128-N (128 generally) has a network infrastructure capability for receiving the device instructions 122. Typically this includes at least some kind of modem and wireless access point device 131 for receiving IP (Internet Protocol) messages, but other transport mediums may suffice. Other configurations may include a local computing device (PC) 132, either wired or wirelessly in communication with the network 130. Other suitable mediums include a local network device 133 for alternate mediums, such as a mesh, wired, RF or similar transport.

Whatever the local infrastructure, the server 150 transmits the device instruction 122 to the corresponding device 120 in the dwelling 128. Generally, devices 120 are indexed according to user, dwelling and room. Upon sufficient learning, agents 250 issue autonomous device instructions 222 as called for by the predictions.

Figure 4:
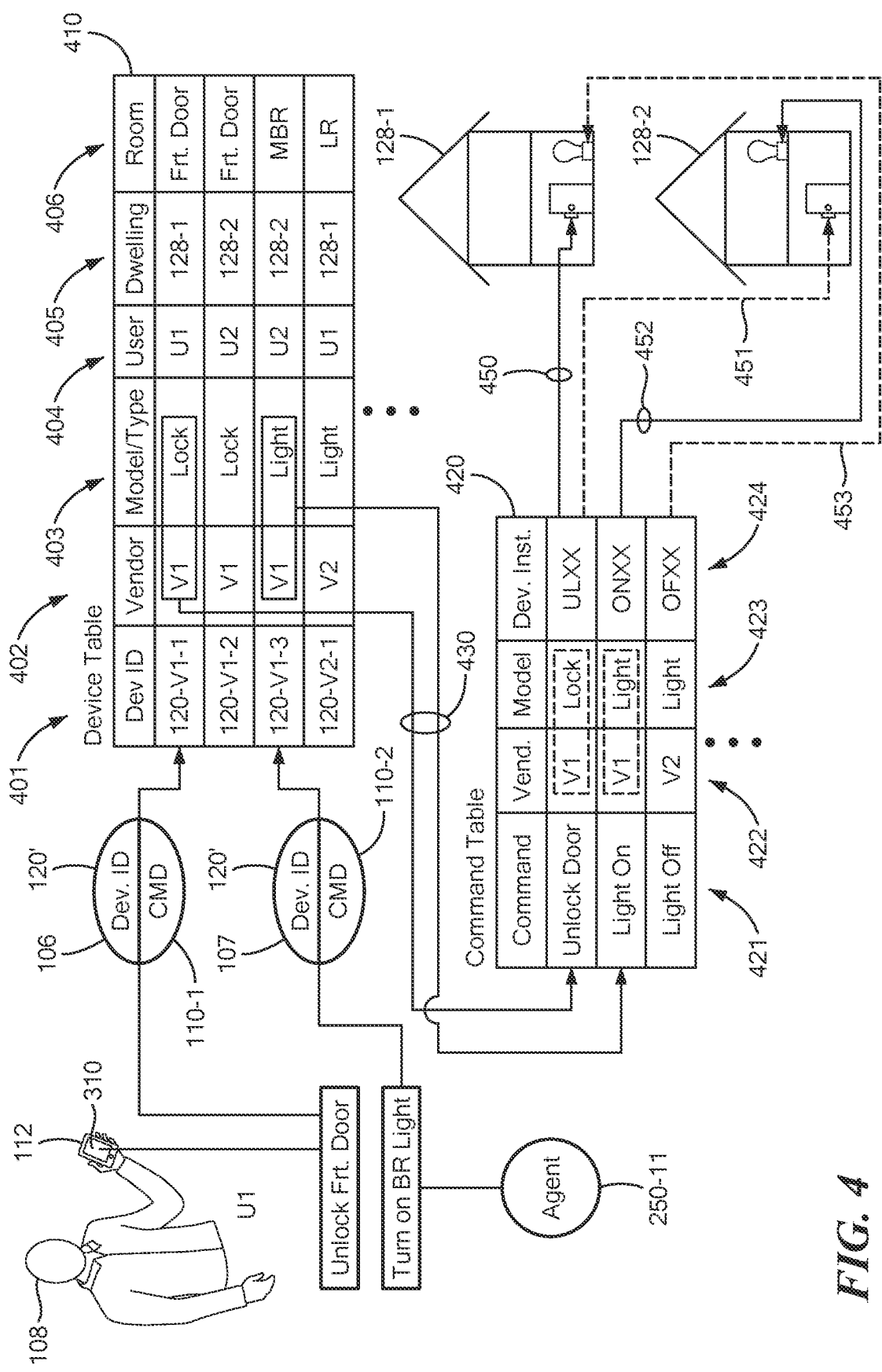
FIG. 4 shows a mapping from a user command to a device instruction issued to a device in the users's home.

FIG. 4 shows a mapping from a user command to a device instruction issued to a device in the users's dwelling. Referring to FIGS. 1-4, the server 150 supports the mobile app 312 and GUI 310 with a set of descriptive commands agnostic to a particular vendor. Users need not be concerned with particular vendor command sets or which vendor's devices are located in particular dwelling locations. Rather, the user issues a generic command 110, generally concerning a particular room/location and a direction requested of the device.

An example mapping of user issued commands 110 is shown using a device table 410 and a command table 420. A user 108 enters a command to unlock the front door on their mobile device 112. The app 312 assembles an instruction message 106 via the GUI 310 including the requested command 110-1 and a device ID 120' to uniquely identify the device from other devices in the dwelling or of other users.

The example illustrates the device table 410 and command table 420 as an implementation for mapping the user entered, vendor agnostic command from the GUI 310 to a specific device at the dwelling of the user. Other approaches for performing the mapping and referencing the device instruction sought may be implemented.

The GUI 310 identifies a device 120 associated with the command 110 based on the user 108 and dwelling 128. The device table 410 includes at least fields for the device ID 401, vendor 402 of the device, a model or type 403 of the device, the user 404 authorized to issue the command, a dwelling 405 identification such as a postal address, and a room 406 within the dwelling 128 where the device is located. The device ID 120' is invoked to identify the vendor 402 and model 403 of the concerned device 120-V1-1. This provides a key 430 to translate the command 110-1 for mapping, based on the vendor, the command to the device instruction column 424 recognized by the device for performing the action, in this case unlocking the front door of dwelling 128-1.

The command 421 for unlocking the door will have different entries for each vendor 422, and optionally for each model 423 of the vendor, to allow the device instruction "ULXX" to be retrieved for the specific device 120 user U1 has installed on the front door at their dwelling 128-1. A message 450 including the mapped device instruction ULXX is sent to device 120-V1-2. Note that the same device instruction might be mapped for a command from user U2, since the vendor and model are the same, shown by dotted line 451.

Operation of the agent 250 occurs by issuing an autonomous instruction 222 based on a similar mapping sequence. Agent 250-11 predicts a command for user U2 of dwelling 128-2 to turn on the master bedroom light, controlled by device 120-V1-3. A command packet 107 includes the command 110-2 and the device ID 120-V1-3 controlling the MBR light, in room field 406. Key 430 is invoked to identify a matching "light on" entry 421 in the command table, and references device instruction ONXX based on matching vendor 422 and model 423 fields. The mapped device instruction is sent 452. Alternatively, a user of dwelling 128-2 could have manually entered a similar command on their GUI. Another device instruction may be sent 453 if a light off command was received on behalf of the living room light of dwelling 128-1 (U1). Any suitable number of entries for vendor and model/type of devices may be made in command table 420 to define a mapping from the generic, vendor agnostic commands 110 to a device instruction 122 specific to the vendor and model. Similarly, the device table 410 includes entries for each dwelling and the devices therein.

Figure 5:
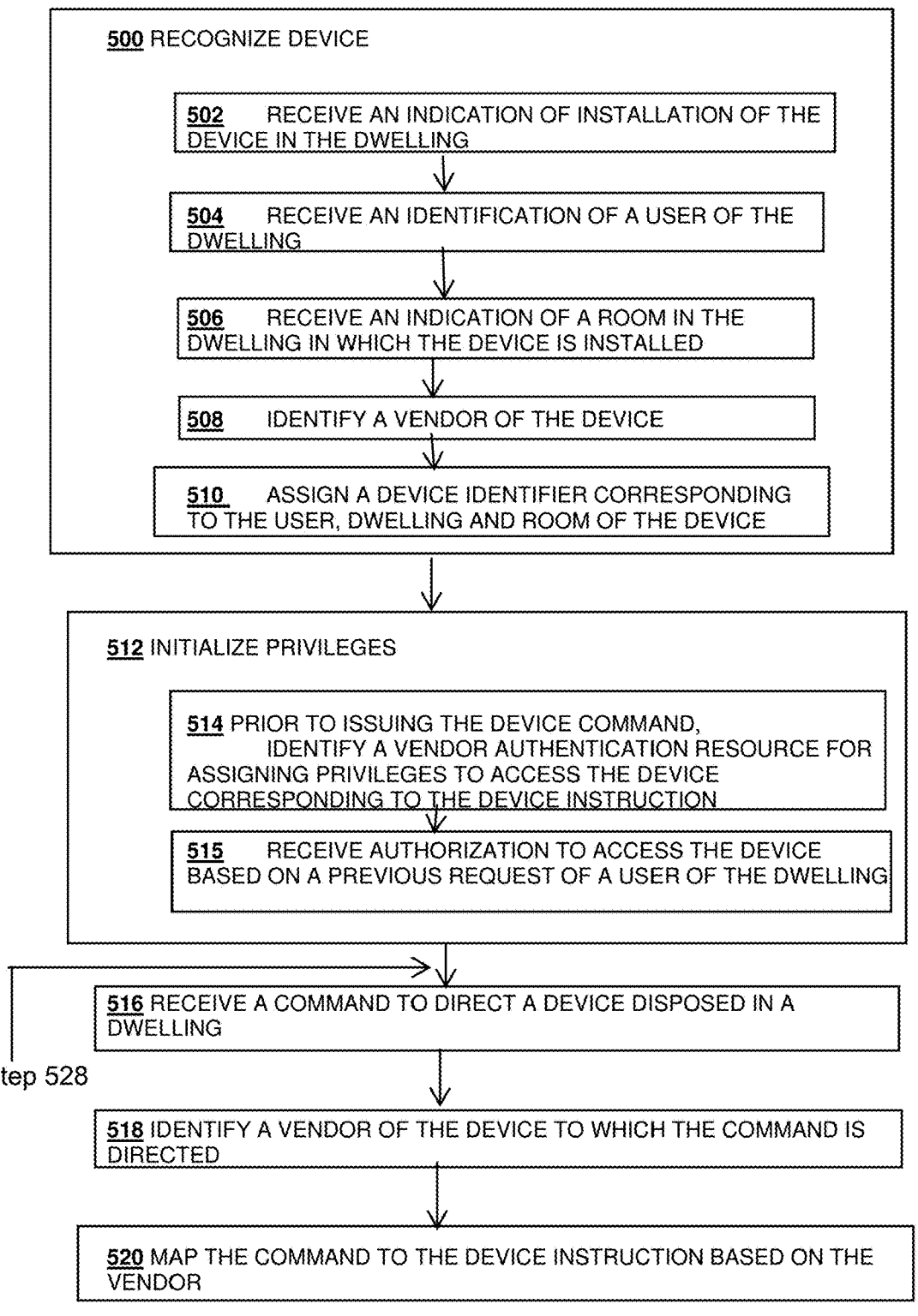
FIG. 5 is a flowchart of autonomous device operation according to FIGS. 1-4.
Figure 5:
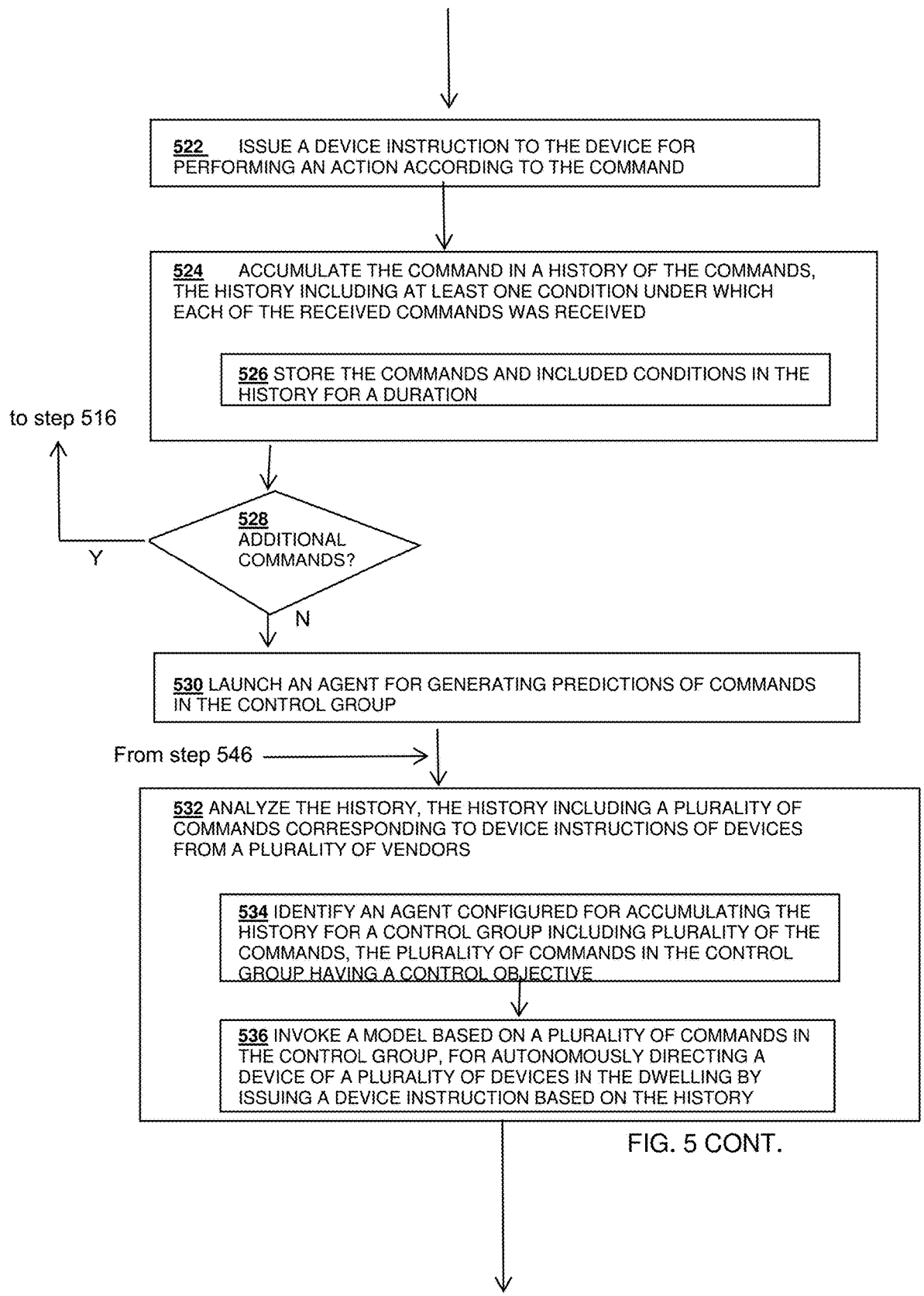
Figure 5:
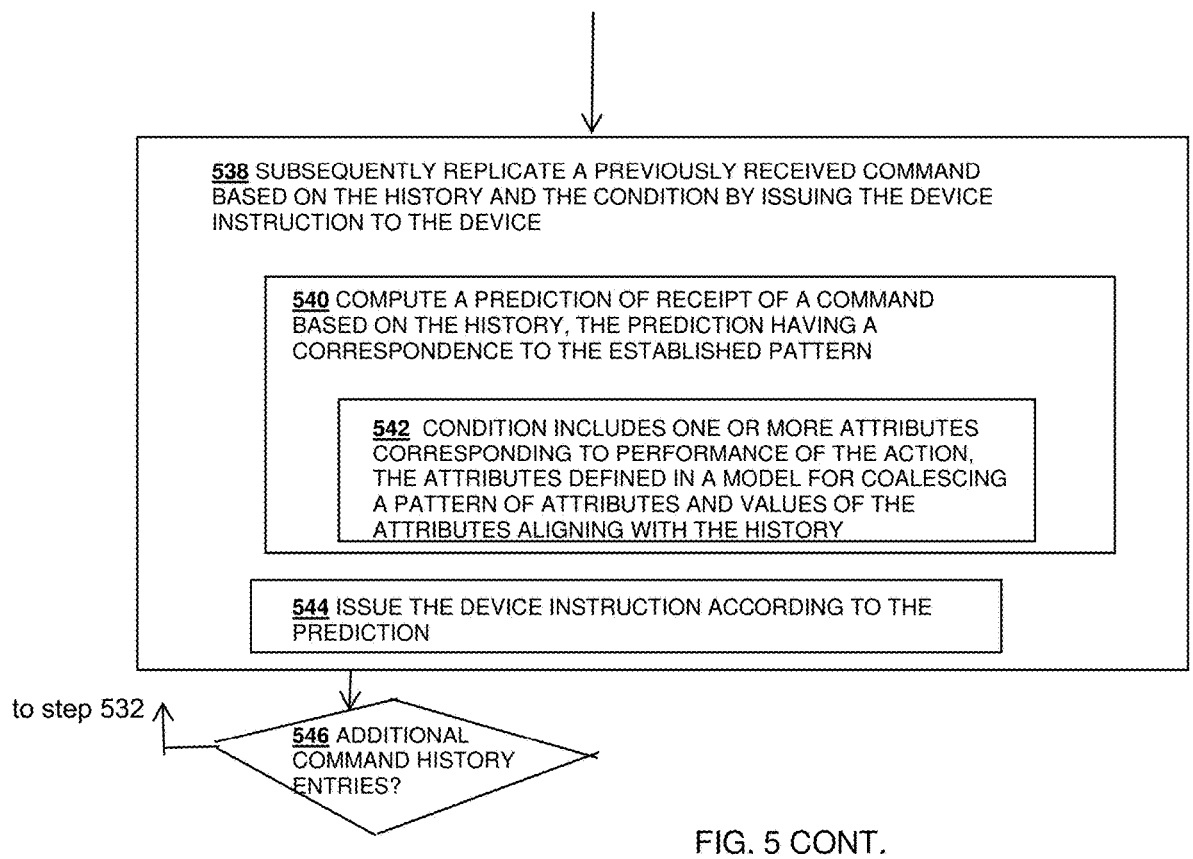

FIG. 5 is a flowchart of autonomous device operation according to FIGS. 1. This includes device installation and initialization for creating entries in the relevant tables as shown in FIG. 4. User registration with the system, as well as privilege establishment to allow the server 150 access to the device 120, is also established. Since the device 120 includes security and entry related functions for the dwelling 128, vendors need to give appropriate diligence to access control.

Customer/purchaser authorization must also be extended to the server for allowing similar control. Referring to FIGS. 1-5, at step 500, the device 120 is recognized by the server 150 for use as disclosed herein. A typical device recognition occurs as individual devices are purchased, or as a bulk measure as when a new home is equipped with devices 120.

The server 150 receives an indication of installation of the device in the dwelling, as depicted at step 502, and receives an identification of a user of the dwelling 128, at step 504. An indication of a room in the dwelling 128 in which the device 120 is installed is received at step 506, and the vendor of the device is identified at step 508. This permits population of appropriate entries in the device table 410 for the respective user 108. It is generally expected that a particular user is associated with a dwelling 128, although multi-tenant units and alternate users such as spouses and family members may be accommodated without deviating substantially from the principles and methods discussed here.

The server 150 assigns a device identifier 401 corresponding to the user, dwelling and room of the device to complete the population of the device table 400, as shown at step 510. For a recognized device, the command table 420 already has corresponding entries for the device instructions.

Device privileges are coordinated at step 512. Prior to issuing a device command, the server, with user 108 assistance, identifies a vendor authentication resource for assigning privileges to access the device corresponding to the device instruction, as depicted at step 514. Depending on the vendor's procedures, the server 150 receives authorization to access the device based on a previous request of a user of the dwelling, as disclosed at step 515.

The server 150 is now capable of managing an automated dwelling having one or more devices responsive to commands for executing home automation functions for the installed devices. At step 516, a command 110 is received to direct a device 120 disposed in the dwelling 128, either from the user GUI 310 or as an autonomous command from an agent 250, as discussed above. At a minimum, a device ID 120' is included, which are available to the app 312 on the phone for the particular user. The server 150 identifies the vendor of the device to which the command is directed, as depicted at step 518, and maps the command to the device instruction 424 based on the vendor, at step 520, also disclosed in FIG. 4 above.

The server 150 then issues the device instruction 122 to the device for performing an action according to the command 110, as shown at step 522. Concurrently, the server 150 accumulates the command 210 in the history 200 of the commands, such that the history including at least one condition, and likely multiple, under which each of the received commands was received, as shown at step 524. The history 200 may span any suitable number of commands; it is expected that the history will store the commands and included conditions for a predetermined duration, as shown at step 526, to allow meaningful analysis by the agents for establishing a pattern and computing a prediction. The server iterates for receiving successive commands and servicing users in a normal operational capacity, as shown at step 528, The server 150 launches one or more agents 250-1 . . . 250-N (250 generally) for generating predictions of commands in a control group or focus of operational areas, such as light, air quality, entry, and others, as depicted at step 530. The agents 250 analyze the history 200, which includes the plurality of commands corresponding to device instructions of devices from a plurality of vendors, as depicted at step 532. Each agent need only analyze or consider commands pertaining to its control group or focus. A lighting agent will likely not be concerned with lawn watering, for example.

During agent operation, each agent is configured for analyzing and accumulating the history for a control group including a plurality of the commands, such that the plurality of commands in the control group have a control objective or focus, as depicted at step 534. In other words multiple agents may be instantiated to each predict commands of a particular focus, theme or goal, such as effective lighting, entry monitoring, air quality and the like. This means that each agent likely has a subset of particular commands which it may be expected to autonomously issue. Each agent invokes a model 255 based on a plurality of commands in the control group, for autonomously directing a device of a plurality of devices in the dwelling by issuing a device instruction based on the history, as depicted at step 536. The model may be based on a subset of the history 200, although each agent 250 may observe the full history 200.

Agents 250 operate at the behest of the server, and are therefore delegations or extensions of the server for authentication and access privileges. Agents 250 interact with the server 150 through an API that has permissions checking and controls. The API checks that: the agent is allowed to access the home—access to the home is enabled by the user when they enable the agent. An analogy for device installation would be of an 'agent store,' like an app store, where the user can choose from a list of available agents and subscribe/unsubscribe agents to their home.

In operation, each agent 250 includes a declared list of permissions of what it wants to access (i.e. what parts of the home configuration, what devices it wants to control or get state information from, etc.). The server 150 maps the agent APIs to internal APIs to the parts of the server that can fulfill the request. The permissions & mapping function help to ensure 3rd party agents don't try to access unauthorized data or devices.

During agent 250 execution, the agent subsequently replicates a previously received command based on the history and the condition by issuing the device instruction to the device, as disclosed at step 538. These autonomous commands are based on computing a prediction of receipt of a command based on the history, such that the prediction has a correspondence to the established pattern, as depicted at step 540. Such conditions include one or more attributes corresponding to performance of the action, where the attributes are defined in the model for coalescing a pattern of attributes and values of the attributes aligning with the history 200 as analyzed by the particular agent 250, depicted at step 542. Once the prediction surpasses a predetermined likelihood, the agent 250 issuing a command to trigger the autonomous device instruction 222 according to the prediction, as shown at step 544. The agents 250 continue analyzing and predicting as new user commands 110 refine the model, depicted at step 546.

The agents typically manifest autonomous operation through machine learning based on the history analysis. Each agent generates a model corresponding to its designated focus. Artificial intelligence (AI) approaches identify conditions tending to match the features in the model that are associated with previous commands. The correspondence of matching features to current conditions give a prediction of replication of a command. For example, if front porch lights have been previously turned on at around 5 pm each day for a duration of 10 days, this supports a strong prediction that a command to turn on the front porch lights at 5 pm should be replicated.

In a simple analysis, if 4 features are associated with a command, and current conditions indicate a match of 3 of the 4 features, this supports a prediction of 75% that the command should be replicated. Similarly, a match of 9 of 10 features supports a 90% prediction. Actual predictions supported by the agents, and corresponding model, are generally more complex. A number of agents may be instantiated, each having a model for predictions of a predetermined theme or focus.

Figure 6:
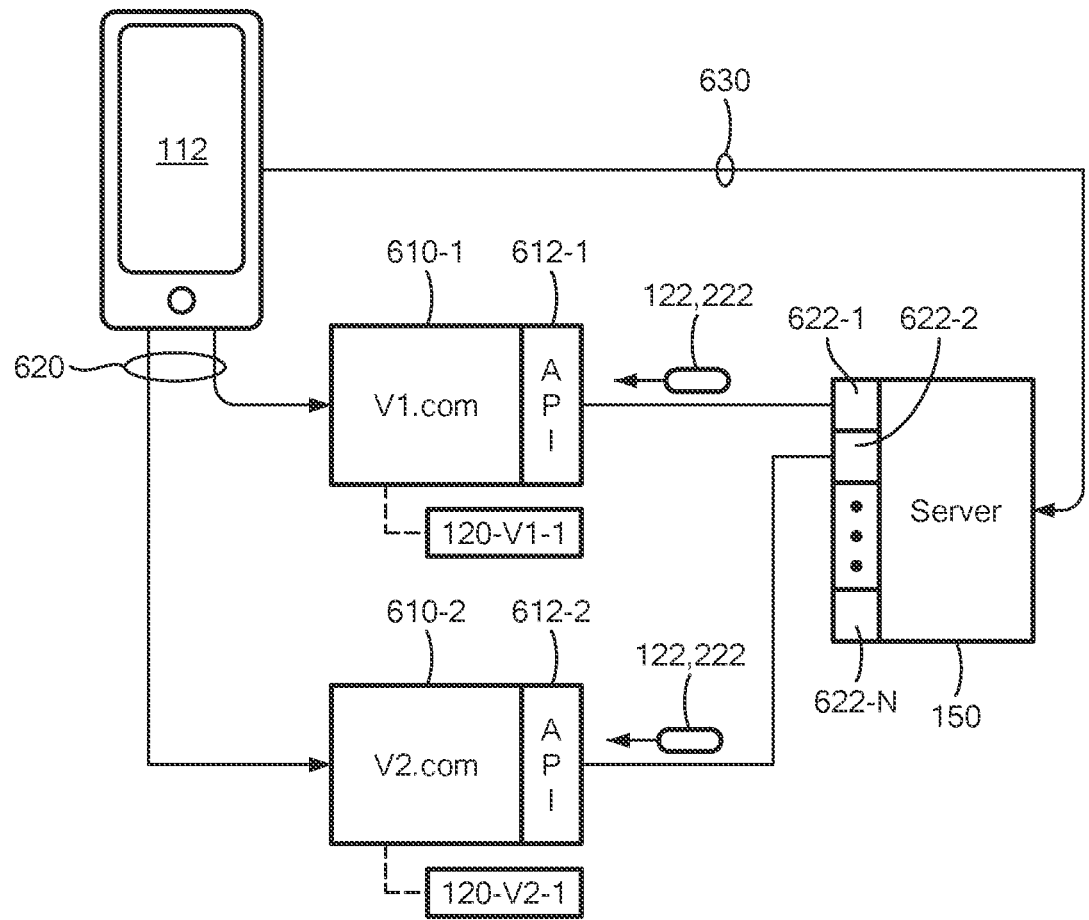
FIG. 6 shows setup and installation for authorization of devices by the server.

FIG. 6 shows setup and installation for authorization of devices by the server. As indicated above, individual devices 120 are initialized and installed into the system based on their vendor prescribed authentication and permission sequence. Referring to FIGS. 1-6, devices responsive to the server 150 emanate from different vendors, such as 120-V1-N and 120-V2-N, distributed by vendors V1 and V2 respectively. Vendors typically have a registration or authentication site for registering the user and exchanging credentials for permitting remote (Internet) usage via the vendor's website. The server 150 is added or endowed with privileges to also access the device remotely via a network connection. Vendor V1 has website V1.com 610-1, and vendor V2 has website V2.com 610-2. Each site has a respective API 612-1 . . . 612-2 (612 generally) to permit programmed, remote access from a set of instructions other than the vendor supplied GUI. The server 160 also has vendor specific interfaces 622-1 . . . 622-2 (622 generally) for accessing respective APIs 612.

The server 150 is operable to send device instructions to devices of different vendors based on mapping of device specific commands. As described, this is often performed by accessing and/or registering the server with the vendor specific website of the device to be controlled. In other words, once the server receives the command and maps it to a particular device instruction, the control path may be via the vendor specific website as an authorized user. Alternatively, the server 150 may publish a common API that device vendors can integrate into their clouds, thus removing the need for mapping functions. In such operation, the server 150 maps a device (manufacturer and model) to a configuration for the manufacturer's device cloud, using information such as the URL is to access the device cloud of the particular vendor. These implementation details do not deviate from the control of the dwelling devices by the server 150 or the agent 250. The server 150 handles the vendor website redirection, based on the vendor specific interface.

The purchasing/owning user employs their device 112 to authenticate 620 themselves and their devices to the vendor specific website. The server 150 also receives a credential 630 or analogous vehicle, or alternatively the vendor site may receive a network ID of the server for a whitelist. Subsequent device instructions 122 and autonomous instructions 222 include at least this credential 630 or implicitly a network identifier (e.g. IP, MAC address) by the particular API 612 when accessing the devices of the vendor. Optionally, authentication need be done only once, upon initialization, and the server 150 can direct the devices directly and/or the devices themselves will interact with the vendor website 610 upon instruction receipt.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In an automated dwelling environment having one or more devices responsive to commands for executing home automation functions, a method of directing the devices comprising:
    receiving a command at an agent to direct a device disposed in a dwelling;
    upon receiving the command:
        referencing a device table associating the device and the dwelling associated with the command;
        identifying, from the device table, a vendor of the device to which the command is directed;
        referencing a command table associating the command to a device instruction recognized by the device for performing an action; and
        mapping, based on the vendor, the command to the device instruction;
    accumulating the command in a history of the commands, the history including at least one condition under which each of the received commands was received;
    issuing the device instruction mapped from the command to the device for performing the action according to the command;
    storing the received command and one or more corresponding conditions as a history of received commands;
    identifying, by the agent, a subsequent set of conditions having a similarity to the corresponding conditions of the stored command; and subsequently replicating a previously received command based on the history of received commands and the condition by issuing the device instruction to the device from the agent.

2. The method of claim 1 wherein the at least one condition includes a time, the time indicative of the received command.

3. The method of claim 1 wherein the at least one condition includes one or more attributes corresponding to performance of the action, the attributes defined in a model for coalescing a pattern of attributes and values of the attributes aligning with the history.

4. The method of claim 3 further comprising identifying an agent corresponding to the command, the agent configured for accumulating the history for a control group including a plurality of the commands, the plurality of commands in the control group having a control objective.

5. The method of claim 4 further comprising launching the agent for generating predictions of commands in the control group, further comprising:
   analyzing the history, the history including a plurality of commands corresponding to device instructions of devices from a plurality of vendors; and
   invoking the model based on a plurality of commands in the control group, for autonomously directing a device of a plurality of devices in the dwelling by issuing a device instruction based on the history.

6. The method of claim 1 further comprising, prior to issuing the device command,
   identifying a vendor authentication resource for assigning privileges to access the device corresponding to the device instruction; and
receiving authorization to access the device based on a previous request of a user of the dwelling.

7. The method of claim 6, further comprising:
   identifying an agent associated with the dwelling;
   receiving an indication of privileges assigned to the agent for issuing commands; and
   sending, from the agent, a commend via the server to direct a device in the dwelling.

8. The method of claim 1 further comprising:
   receiving an indication of installation of the device in the dwelling;
   receiving an identification of a user of the dwelling;
   receiving an indication of a room in the dwelling in which the device is installed;
   identifying a vendor of the device; and
   assigning a device identifier corresponding to the user, dwelling and room of the device.

9. The method of claim 1 further comprising:
   storing the commands and included conditions in the history for a duration;
   computing a prediction of receipt of a command based on the history, the prediction having a correspondence to the established pattern; and
   issuing the device instruction according to the prediction.

10. A network device for managing home automation operations, comprising:
    an interface to a mobile device for receiving a command at an agent to direct a device disposed in a dwelling for performing autonomous home actions;
    a device table associating the device and the dwelling. the device table_configured for, upon receiving the command:
       referencing the device table for identifying a device associated with the command; and
       identifying, from the device table, a vendor of the device which the command is directed;
    a command table configured for mapping, based on the vendor, the command to the device instruction recognized by the device for performing the action;
    a repository for accumulating the command in a history of the commands, the history including at least one condition under which each of the received commands was received;
    command logic for issuing the device instruction mapped from the command to the device for performing the action according to the command;
    a history of received command for storing the received command and one or more corresponding conditions;
    the agent configured for identifying a subsequent set of conditions having a similarity to the corresponding conditions of the stored command; and
    the agent further configured for subsequently replicating a previously received command based on the history of received commands and the condition by issuing the device instruction to the device.

11. The device of claim 10 wherein the at least one condition includes a time, the time indicative of the received command.

12. The device of claim 10 wherein the at least one condition includes one or more attributes corresponding to performance of the action, the attributes defined in a model for coalescing a pattern of attributes and values of the attributes aligning with the history.

13. The device of claim 12 wherein the control logic is configured to identify an agent corresponding to the command, the agent configured for accumulating the history for a control group including a plurality of the commands, the plurality of commands in the control group having a control objective.

14. The device of claim 13 further comprising a model, the model based on a plurality of commands in the control group, for autonomously directing a device of a plurality of devices in the dwelling by issuing a device instruction based on the history.

15. The device of claim 10 further comprising a mapping table in the repository, wherein the control logic is further configured to, upon receiving the command,
    identify a device associated with the command;
    identify a vendor of the device; and
    lookup in the mapping table, based on the vendor, the command to the device instruction recognized by the device for performing the action.

16. The device of claim 10 further comprising at least one interface to a vendor authentication resource for, prior to issuing the device command,
    identify the vendor authentication resource for assigning privileges to access the device corresponding to the device instruction; and
    receive authorization to access the device based on a previous request of a user of the dwelling.

17. The device of claim 10 further comprising a device table including a device identifier corresponding to the vendor, user, dwelling and room of the device.

18. The device of claim 17 further comprising a command table responsive to the command and the vendor for mapping the command to the device instruction based on the vendor.

19. The device of claim 10 wherein the agent is further configured to:
    analyze the commands and included conditions stored in the history and spanning a predetermined duration;

compute a prediction of receipt of a command based on the history, the prediction having a correspondence to the established pattern; and issue the device instruction according to the prediction.

20. A computer program embodying program code on a non-transitory medium that, when executed by a processor, performs steps for implementing a method of directing devices for home automation functions, the method comprising:

receiving a command at an agent to direct a device disposed in a dwelling;

upon receiving the command:

referencing a device table associating the device and the dwelling associated with the command;

identifying. from the device table, a vendor of the device to which the command is directed;

referencing a command table associating the command to a device instruction recognized by the device for performing an action; and mapping, based on the vendor, the command to the device instruction;

accumulating the command in a history of the commands, the history including at least one condition under which each of the received commands was received;

issuing the device instruction mapped from the command to the device for performing the action according to the command;

storing the received command and one or more corresponding conditions as a history of received commands;

identifying, by the agent. a subsequent set of conditions having a similarity to the corresponding conditions of the stored command; and subsequently replicating a previously received command based on the history of received commands and the condition by issuing the device instruction to the device from the agent.

* * * * *